April 22, 1952 — J. M. VAN METER — 2,593,940

ANIMAL LEASH

Filed Jan. 24, 1948

INVENTOR.
JOHN MILTON VAN METER
BY Hanrahan & Mattern
ATTORNEYS.

Patented Apr. 22, 1952

2,593,940

UNITED STATES PATENT OFFICE 2,593,940

ANIMAL LEASH

John Milton Van Meter, Los Angeles, Calif.

Application January 24, 1948, Serial No. 4,180

1 Claim. (Cl. 119—96)

The present invention relates to an improved animal leash, particularly for use with small animals such as dogs, and has for an object to provide a leash for effectually obtaining positive control over the animal in guiding and restraining it, while at the same time permitting limited freedom of travel to the animal. It is also an object to provide a leash which may be comfortably grasped in the hand, either with a relaxed grip, or with a tight grip when it becomes necessary to guide and restrain the animal. It is a further object to provide a leash structure which effectually eliminates the possibility of the hand becoming entangled in the leash.

A further object is to provide a leash having a rigid non-extensible guide and snubbing member adapted to be gripped by the hand, and having a flexible leash, cord or strap extending from the end of the rigid member to the collar of the animal. Thus there is provided a combined rigid and flexible leash between the hand and the collar of the animal permitting control of the normal travel of the animal without strain between the collar of the animal and the hand, and which, through manipulation of the rigid member, enables the animal to be guided around objects or in a desired direction in a positive manner.

It is further proposed to provide yieldable means connected to the flexible leash, cord or strap and disposed within the rigid member, which will normally remain inert during the normal travel of the animal, but will become tensioned when there is any sudden pull or jerk on the leash, so that the shock of such sudden pull or jerk is absorbed and is not transmitted directly to the hand. A further object is to provide such yieldable means which will permit a limited extension of the leash while at the same time gradually increasing the restraining force on the movement of the animal, and further to provide a snubbing action, brought about through manipulation of the rigid member, which will restrain the extension movement of the leash to any degree desired by the person controlling the animal. The snubbing action, for instance, is such that a person may manipulate the rigid member of the leash in a manner to resist any appreciable extension of the leash under the pull of the animal, and also by manipulation may permit the animal to freely extend the leash to its full extension limit.

Other objects are to provide a leash structure which is compact, light, simple in operation, and which may through selective choice of its components be designed for various types of animals according to their size and strength.

With the above and other objects in view, embodiments of the invention are shown in the accompanying drawings, and these embodiments will be hereinafter more fully described with reference thereto, and the invention will be finally pointed out in the claims.

In the drawings.

Similar reference characters indicate corresponding parts throughout the several figures of the drawings.

Figure 1:
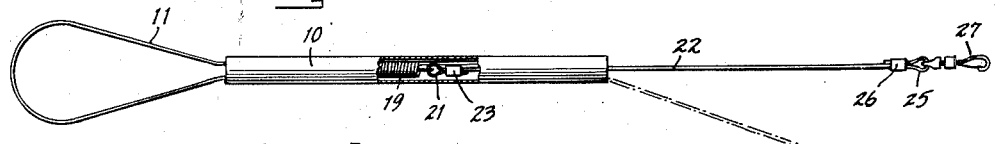
Fig. 1 is a side elevation, partly broken away, of a leash according to one embodiment of the invention, the leash strap being shown in its normal non-extended position.

Referring to the drawings and more particularly to Figs. 1 to 4 thereof, the embodiment of the invention shown therein comprises a tubular guide and snubbing member 10 of suitable length and formed of metal, plastic, or other suitable material, being provided at one end with a looped leash handle 11 formed of flexible strap or cord material. The handle is secured within the end of the member 10 by a plug fixture 12 having slots 13—13 through which the ends of the handle are inserted and overlapped to form a projecting loop 14 at the inner end of the fixture 12, for a purpose presently to be more fully described. The overlapped ends of the handle may be secured together in any suitable manner, as for instance by cementing, swaging, stitching, or the like, and the assembled handle and plug fixture are secured within the end of the member 10 by a riveted cross pin 15 engaged through a hole 16 through the fixture 12 and through perforations 17 in the handle.

To the looped end 14 of the handle there is connected the hook 18 at one end of a helical expansion spring 19 disposed within the member 10, the hook 20 at its other end being connected to a loop 21 at the inner end of the flexible non-elastic leash strap or cord 22, the loop end 21 being formed by folding the end of the leash strap upon itself and securing it by a swaged tubular fitting 23.

In the normal non-extended position of the spring 19 its connection with the leash strap is disposed intermediate the ends of the tubular member 10. The outer end of the member 10 is interiorly flared, as at 24, to provide a smooth surface to prevent snagging of the spring upon the end of the member 10 during extension or retraction movement of the leash strap. The surface 24 also constitutes a snubbing surface to frictionally resist extension and contraction movement of the leash strap in varying degree depending upon the angle at which the tubular member 10 is disposed with respect to the leash strap or to the spring, as shown by the dot-and-dash lines in Figs. 1 and 2.

At its outer end the leash strap is provided with a loop end 25 secured by a swaged tubular member 26, and to which is connected a swiveling snap hook 27 for connection to the collar of the animal.

Figure 2:
Fig. 2 is a fragmentary side elevation showing the leash strap extended.
Figures 3, 4:
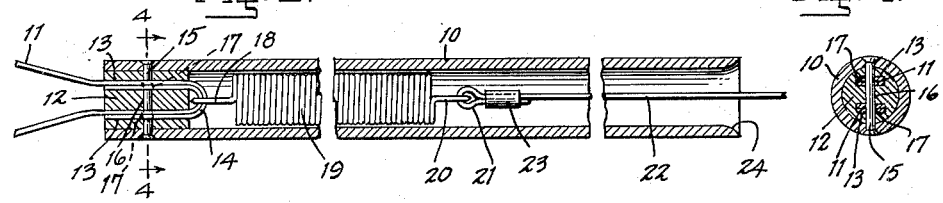
Fig. 3 is a longitudinal sectional view, on an enlarged scale, of the leash shown in Figs. 1 and 2, portions being broken away.
Fig. 4 is a transverse sectional view taken along the line 4—4 of Fig. 3.

In operation the person leading the animal may either directly grip the handle loop 11 in the hand during the casual leading of the animal, or, when it is desired to positively control or guide the directional motion of the animal, the hand may be slipped through the handle loop 11 so that the latter is engaged about the wrist and the hand is grasped about the member 10. During normal leading of the animal when the animal is not straining, the spring 19 will not be extended, being of sufficient strength to resist extension until a considerable strain is imposed thereon. As shown by the dot-and-dash lines in Fig. 1, the member 10 may be disposed at any desired angle with respect to the leash strap, and thus a snubbing action takes place between the leash strap and the inner surface 24 of the member 10. As the angle between the normal straight line position and the snubbing position is increased there is an increase in the snubbing action so that the person leading the animal may thus increase or decrease the resistance to the extension of the leash strap as desired. As the animal pulls on the leash strap the spring 19 will become extended, and any sudden pull or jerk on the leash will be absorbed and will not be directly transmitted to the hand and wrist. As shown in Fig. 2, the extension of the leash strap may draw the end of the spring beyond the end of the member 10, and in this case controlled restraint may be imposed upon the animal by increasing the angle of the strap from its normal straight line position to bring about a snubbing action upon the spring, as shown by the dot-and-dash lines. The direct connection of the loop handle to the spring provides extremely sensitive control, the person leading the animal having a direct "feel" through the loop handle of the animal's movements.

Figure 5:
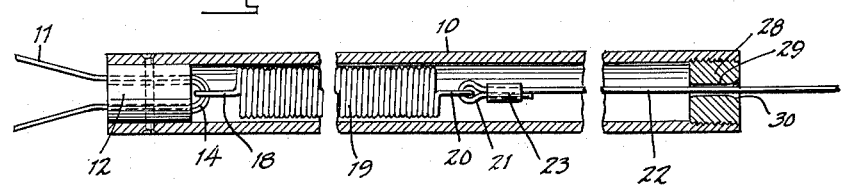
Fig. 5 is a longitudinal sectional view, partially broken away, of a modified form of the invention.

In Fig. 5 there is shown a modification of the invention in which the outer end of the member 10 has screwed therein a threaded cap 28 having a passage 29 therethrough in which the leash strap 22 is guided, the outer end of this passage being flared as at 30 to provide a snubbing surface for the leash strap. In this embodiment the extension of the leash strap is limited to the movement of the spring within the member 10.

Figure 6:
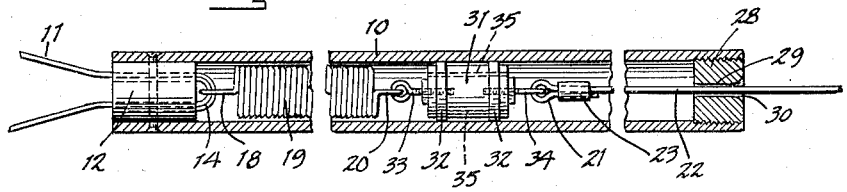
Fig. 6 is a longitudinal sectional view, partially broken away, of another modified form of the invention.

In Fig. 6 there is shown a modification of the invention in which a piston 31 having sealing piston rings 32—32 is interposed between the spring and the leash strap, screw eyes 33 and 34 being secured in its ends and respectively connected to the hook end 20 of the spring and the loop end 21 of the leash strap. Air ducts 35 extend through the piston to allow a controlled amount of air to pass from one side to the other. The piston helps retard extensioning of the spring, thus lessening shock action, and also retards the spring from returning from extended position too rapidly, providing additional snubbing action and making for smoother operation.

Figure 7:
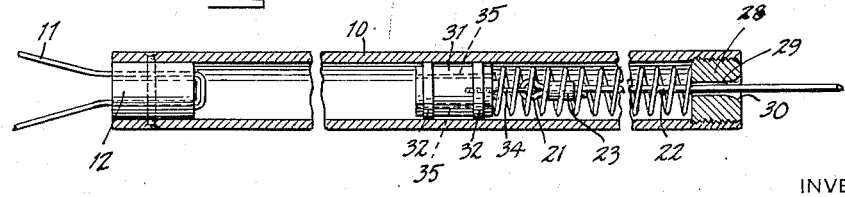
Fig. 7 is a longitudinal sectional view, partially broken away, of still another modified form of the invention.

In Fig. 7 there is shown a further modification in which the expansion spring 19 is dispensed with, and in its place is provided a compression spring 36 disposed between the cap 28 and the piston member 31. This embodiment is especially suited to smaller animals where a longer and light weight guide and snubbing member 10 is desirable and where the shock absorbing action is not in the higher magnitudes of force.

I have illustrated and described preferred and satisfactory embodiments of the invention, but it will be understood that changes may be made therein, within the spirit and scope thereof, as defined in the appended claim.

What is claimed is:

An animal leash, comprising a rigid elongated straight tubular guide and snubbing member adapted to be grasped by the hand and provided at its outer end with a guide passage having an annular flared snubbing surface, a flexible non-elastic leash member having its inner end disposed within said tubular member for relative longitudinal movement therein, said leash member being extended outwardly through said guide passage and having its outer end substantially spaced from said tubular member whereby an intermediate point of said flexible non-elastic leash member has snubbing engagement with said snubbing surface when said leash member has its outwardly extended portion at an angle to said guide and snubbing member and is free of said snubbing surface when said outwardly extended portion is in a straight co-axial relation with said guide and snubbing member, means on said outer end of said leash member for attaching to an animal collar, and spring means cooperatively arranged between an interior portion of said tubular member and the inner end of said leash member, adapted to be placed under stress through outward pull of said leash member and adapted when stressed to exert a retractive force on said leash member.

JOHN MILTON VAN METER.

REFERENCES CITED

The following references are of record in the file of this patent:

UNITED STATES PATENTS

| Number | Name | Date |
|---|---|---|
| 373,097 | Russwurm | Nov. 15, 1887 |
| 913,680 | Belcher | Mar. 2, 1909 |
| 1,380,891 | Gaines | June 7, 1921 |
| 2,232,291 | Thompson | Feb. 18, 1941 |
| 2,275,701 | Taylor | Mar. 10, 1942 |
| 2,322,897 | Bogaerde | June 29, 1943 |
| 2,337,970 | Cassell | Dec. 28, 1943 |

FOREIGN PATENTS

| Number | Country | Date |
|---|---|---|
| 117,116 | Great Britain | July 3, 1918 |